F. BURCHARTZ.
APPARATUS FOR MAKING HOLLOW BUILDING BLOCKS.
APPLICATION FILED JAN. 21, 1910.
978,003.
Patented Dec. 6, 1910.
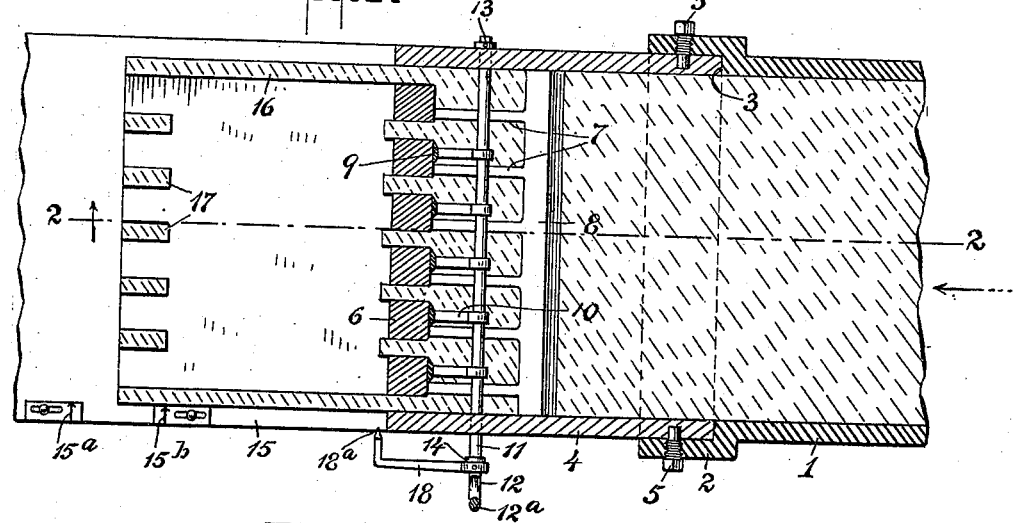
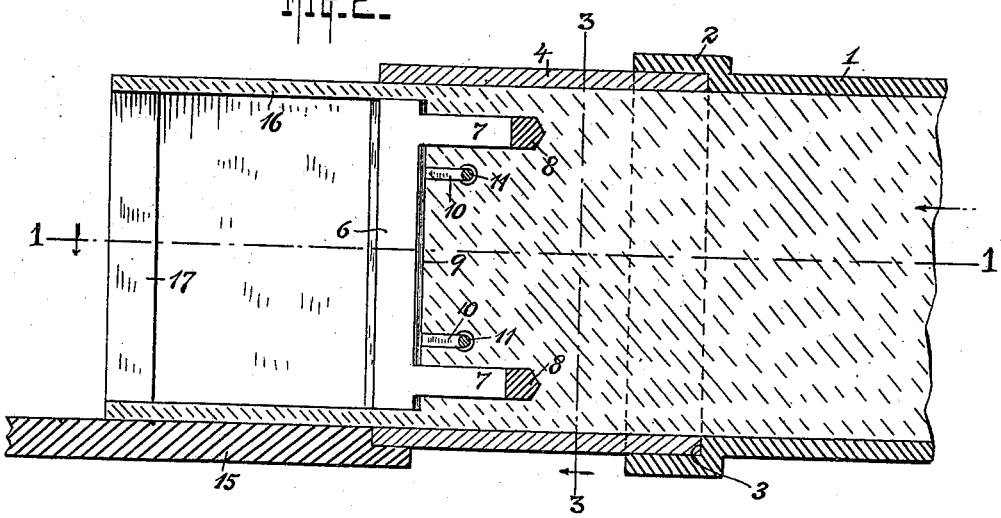
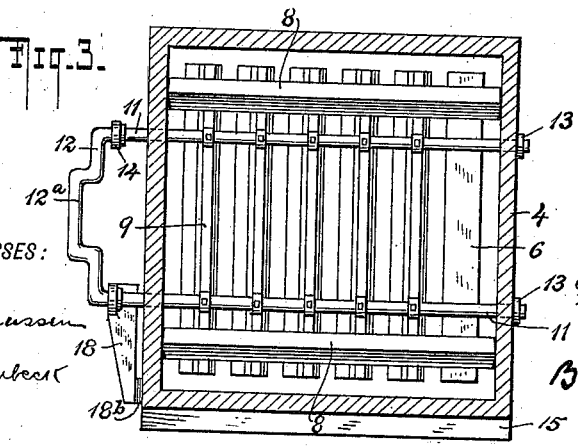
WITNESSES:
INVENTOR
Ferdinand Burchartz
BY
Briesen & Knauth
ATTORNEYS

UNITED STATES PATENT OFFICE.

FERDINAND BURCHARTZ, OF NEW YORK, N. Y.

APPARATUS FOR MAKING HOLLOW BUILDING-BLOCKS.

978,003.   Specification of Letters Patent.   Patented Dec. 6, 1910.

Application filed January 21, 1910. Serial No. 539,279.

*To all whom it may concern:*

Be it known that I, FERDINAND BURCHARTZ, a subject of the Emperor of Germany, and resident of the borough of Manhattan, city, county, and State of New York, have invented certain new and useful Improvements in Apparatus for Making Hollow Building-Blocks, of which the following is a specification.

My invention relates to apparatus for the manufacture of hollow building blocks and has for its object to provide an apparatus of this kind which is simple and effective in operation and which will produce a hollow block having spaced parallel partitions extending across the usual open ends, the space between which, after the block has been drawn out, may be closed or filled with mortar or similar material to form a complete cubical hollow block.

My invention will be fully described hereinafter and the features of novelty will be pointed out in the appended claims.

Reference is to be had to the accompanying drawings in which—

Figure 1 is a sectional view of my improved apparatus in the line 1—1 of Fig. 2; Fig. 2 is a sectional view thereof on the line 2—2 of Fig. 1 and Fig. 3 is a cross section on the line 3—3 of Fig. 2.

In the drawings, 1 represents a portion of the usual receptacle for holding the mixture or material of which the blocks are to be made and which preferably is formed with an enlarged or flaring end 2 forming a shoulder 3. This enlarged end 2 is adapted to receive one end of a forming or molding section 4 which abuts against the shoulder 3 and is maintained in position and against lengthwise movement by means of bolts 5 extending through the walls of the receptacle 1. At the end opposite to that secured as above described the section 4 is provided with spaced bars or rods 6, each of which is secured to arms 7 located respectively near each end of each bar 6. These arms 7 are in turn carried by cross rods 8 fastened in said section 4 so as to extend across the axis thereof at a distance from its free or discharge end. The bars 6 are of such a length and so located as to leave a space between the opposite ends thereof and the upper and lower walls of the section 4 and between the side walls and the adjacent bars as shown in Figs. 2 and 3. There is thus formed an annular space between the bars and the walls of the section 4 the purpose of which will be disclosed hereinafter.

A series of shutters 9 are arranged to slide on the rear surfaces of the bars 6 and are mounted on supports 10 which in turn are secured to slide rods 11. These slide rods 11 extend through suitable openings in the opposite vertical walls of the section 4 so as to be slidable therein and are connected at one end by means of a bar 12 bent to form an operating handle 12$^a$. The said rods 11 and the bar 12 are preferably made integral and bent into a substantially U-shaped structure as shown in Fig. 3 of the drawings. Stops 13 are located near the free end of each rod 11 and are intended to abut against the outside surface of the one vertical wall of the section 4 to limit the movement of said rods 11 and consequently of the shutters 9 in one direction. Similar stops 14 are secured to each rod 11 and are adapted to engage the outside surface of the opposite vertical wall for limiting the movement of said rods 11 and shutters 9 in the opposite direction.

From an inspection of Fig. 2 it will be seen that the rods 11 are located at points between the arms 7 and that said arms 7 are secured to the bars 6 to one side of the vertical center of each bar 6 as is clearly shown in Fig. 1. These stationary arms 7 thus do not interfere with the operation of the rods 11 and the shutters 9.

A table 15 is located adjacent to the free end of the section 4 flush with the lower wall or bottom thereof and is adapted to receive the shaped material in a continuous tubular form as it is drawn or forced from the mold section 4.

In operation the material or mixture of which the blocks are to be made is fed to the receptacle 1 and forced therethrough and through the mold section 4 by pressure produced by any suitable and usual mechanism. When the apparatus is started the shutters 9 are in the position most clearly illustrated in Fig. 1 of the drawings with the spaces between the parallel bars 6 free and unobstructed. As the material is fed along it will pass through the annular space between the respective ends of the bars 6 and the walls of the section 4 and between the extreme bars at each side and the said walls of said section 4 to form the walls of the block 16 as shown in Figs. 1 and 2. At the same time some of the material will pass through the spaces between adjacent bars 6 to form spaced partitions 17 which extend from one wall of said block 16 to the opposite wall thereof and are integral therewith. After the material in this condition has been forced through the mold section a sufficient distance to secure the required width of partitions 17, in the direction of the axis of the block the handle 12ᵃ is moved to the right in Fig. 3 or upwardly in Fig. 1 to cause the slide bars 11 and the shutters 9 to be correspondingly moved until the stop 14 engages the wall of the section 4 and prevents further movement in this direction. During this operation of these parts the shutters 9 have cut through the material passing through the spaces between the bars 6 which material forms the partitions 17 and have closed said spaces from the inside. As the operation continues it is impossible for any more material to pass through the spaces between the bars 6 so that in this condition of the apparatus the material is fed only through the annular space between the respective bars and the walls of the section 4. Thus only the walls of the block are now formed and continue to be formed until it is again desired to form another set of partitions which is at a point corresponding to the ending of the first block and the beginning of the next block. At this point the handle 12ᵃ is moved to the left in Fig. 3 or downwardly in Fig. 1 so as to cause the shutters 9 and the rods 11 to be returned to their initial positions or in other words with the spaces between the bars 6 again free and unobstructed. The movement of the said shutters 9 in this direction is limited by the stops 13 abutting against the wall of the section 4 or if desired these stops may be omitted in which case this movement would be arrested by the shutters themselves coming into contact with the adjacent arms 7. After the shutters have thus again been moved from over the spaces between the bars 6 the material is again forced through said spaces to form a second series of partitions 17. The material continues to pass through said spaces until the shutters are again moved to cut off communication between said spaces and the interior of the receptacle.

It is to be understood that each series of partitions formed after the first series are substantially twice the width of said first series owing to the fact that the blocks are subsequently cut at these points and that half of each partition after the first set forms part of one block while the other half forms part of the next succeeding block. It is to be further understood that the material is fed in a continuous mass and that the shutters 9 are periodically operated to form the partitions and cut them at the proper points. To indicate the places at which the blocks are to be cut and also to facilitate the forming of the partitions 9 at proper points after the first series has been completed the following means is provided. An indicating member 18 is secured to move with the slide rods 11 and has its indicating end 18ᵃ which is in the nature of an edged blade at a point beyond the discharge end of the mold section 4. The table 15 is provided at a suitable point with a preferably adjustable indicating point 15ᵃ. The distance between the point 15ᵃ and the indicating end 18ᵃ corresponds to the length of one block. Thus as soon as the beginning of the first block reaches said point 15ᵃ the handle 12ᵃ is moved to manipulate the slide rods 11 and the shutters 9 as above described and at the same time to bring the end 18ᵃ into contact with the material emanating from the mold. This material being still plastic is indented at this point, this indentation indicating the ending of the first block and the beginning of the next succeeding block and also the point at which the cut is to be made. The end 18ᵃ is so located relatively to the point 15ᵃ and to the partitions 17 as to indent the material at a point exactly half way between the beginning of a series of partitions and the ending thereof. The table 15 is further provided with a second indicating mark 15ᵇ to indicate the point at which the shutters 9 are again to be opened. Thus the moment the beginning of the shaped material coming from the mold reaches the mark 15ᵇ the shutters 9 are moved from over the spaces between the bars 6 and remain in this position until the said beginning or foremost end reaches the second mark 15ᵃ when the shutters 9 are brought over said spaces. Thereafter as soon as each successive indentation made by the end 18ᵃ reaches the mark 15ᵇ the shutters are opened and remain open until said indentation reaches the second mark 15ᵃ whereupon said shutters are again closed and at the same time the said material is again indented at the proper point.

It is to be understood that the width of the first series of partitions may be correctly judged and the time to close the shutters properly gaged by the length of shaped material being discharged from the mold. In other words if the partitions are to be three inches wide the shutters are closed the moment three inches of shaped material project from the discharge end of said mold. Thereafter the measuring and gaging is done with the aid of the marks 15ᵃ and 15ᵇ. These marks may be adjustable relatively to the end 18ᵃ and to each other and determine the length of each finished block and the width of the partitions in the direction of the block's axis.

My improved apparatus is thus simple and continuous in operation and is capable of a maximum of efficiency with a minimum expenditure of energy and care. Other mold sections, for instance having curved or other spaced rods instead of parallel straight rods 6 may be substituted for the one shown and described by simply releasing the bolts 5 and removing one mold section from the end 2 and replacing it with another mold section. This ready interchangeability is also valuable if any part of a mold section becomes broken or disarranged as a new section may be readily substituted without necessitating the shutting down of the apparatus for any longer period of time than it takes to change from one mold section to another.

My improved apparatus produces a hollow block having spaced partitions at each end, the spaces between which may be filled with mortar if desired to form a complete hollow cubical block. A block of this description is extremely light and strong and capable of withstanding great strain and is cheaply and quickly manufactured in large quantities of any desired dimensions. My improved block is also fire proof and has all the advantages of a molded block and is produced with much less cost and labor than such molded blocks.

Changes in the specific construction shown and described may be made within the scope of the claims without departing from the spirit of my invention.

I claim:

1. An apparatus for making hollow blocks comprising a tubular receptacle through which the material is forced, foraminated means in said receptacle adjacent to the discharge end thereof for shaping the material as it passes out of said receptacle and movable means for closing some of the foramina against the passage of the material.

2. An apparatus for making hollow building blocks comprising a tubular receptacle through which the material is forced, foraminated means in said receptacle adjacent to the discharge end thereof for shaping the material as it passes out of said receptacle, movable means for closing some of the foramina against the passage of the material, an indicating device connected with said movable means and arranged to be operated to produce an indication on the shaped material as the said movable means is operated to close some of the foramina and indicating means adapted to coöperate with the indications produced by the indicating device to indicate the points at which the movable means is to be operated.

3. An apparatus for making hollow blocks comprising a tubular receptacle through which the material is forced and a plurality of members in said receptacle adjacent to the discharge end thereof, said members being spaced from each other and from the walls of the receptacle for shaping the material as it passes out of said receptacle and movable means for closing the spaces between said members against the passage of the material.

4. An apparatus for making hollow blocks comprising a tubular receptacle through which the material is forced, and a plurality of parallel bars in said receptacle adjacent to the discharge end thereof, said bars being spaced from each other and from the walls of the receptacle for shaping the material as it passes out of said receptacle, and movable means for closing the spaces between adjacent bars against the passage of the material.

5. An apparatus for making hollow blocks comprising a tubular receptacle through which the material is forced, a plurality of parallel bars in said receptacle adjacent to the discharge end thereof, said bars being spaced from each other and from the walls of said receptacle, a series of shutters arranged to close the spaces between adjacent bars against the passage of the material and means connected with said shutters for simultaneously operating all of them.

6. An apparatus for making hollow building blocks, comprising a tubular receptacle through which the material is forced, foraminated means in said receptacle adjacent to the discharge end thereof for shaping the material as it passes out of said receptacle, movable means for closing some of the foramina against the passage of the material, and adjustable means for indicating the points at which said movable means is to be operated.

In testimony whereof, I have hereunto set my hand in the presence of two subscribing witnesses.

FERDINAND BURCHARTZ.

Witnesses:
JOHN A. KEHLENBECK,
G. V. RASMUSSEN.